UNITED STATES PATENT OFFICE.

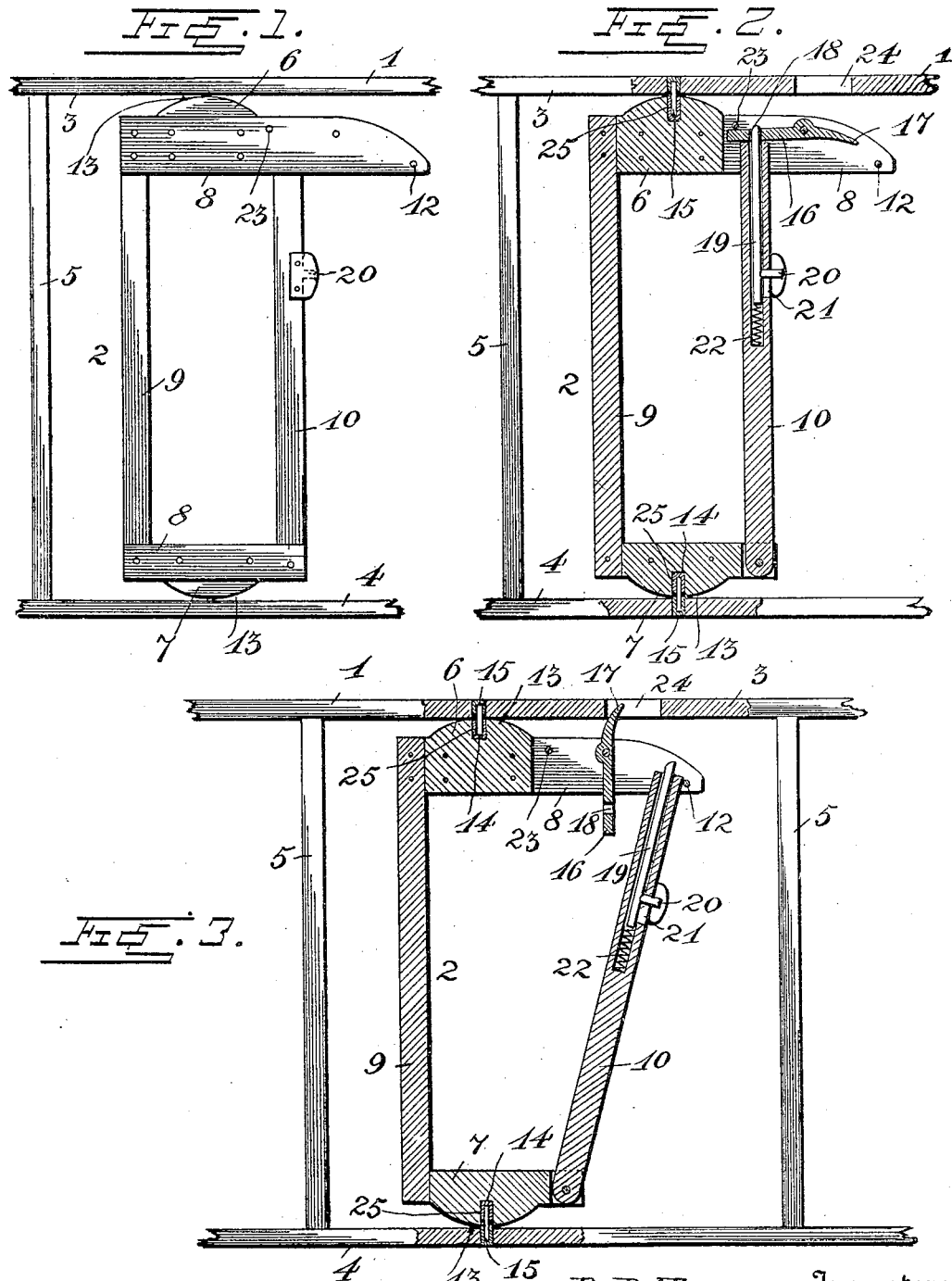

PEARL B. TREWER AND JOHN T. TREWER, OF GENESEO, NEW YORK.

CATTLE-STANCHION.

No. 800,773. Specification of Letters Patent. Patented Oct. 3, 1905.

Application filed March 9, 1905. Serial No. 249,230.

*To all whom it may concern:*

Be it known that we, PEARL B. TREWER and JOHN T. TREWER, citizens of the United States, residing at Geneseo, in the county of Livingston and State of New York, have invented certain new and useful Improvements in Cattle-Stanchions; and we do declare the following to be a full, clear, and exact description of the invention, such as will enable others skilled in the art to which it appertains to make and use the same.

This invention relates to improvements in cattle-stanchions.

The object of the invention is to provide a device of this character which when in closed position will securely hold the animal tied thereby and which when released will be held in position to be engaged by the head of the animal.

A further object is to provide means whereby the stanchion may be readily revolved to permit the same to turn freely with the head of the animal confined therein.

With these and other objects in view the invention consists of certain novel features of construction, combination, and arrangement of parts, as will be hereinafter described and claimed.

In the acompanying drawings, Figure 1 is a front view of a stanchion constructed in accordance with the invention, showing the same closed. Fig. 2 is a vertical sectional view of the same, and Fig. 3 is a similar view showing the parts in released or open position.

Referring more particularly to the drawings, 1 denotes a supporting-frame in which the stanchions 2 are adapted to be pivotally mounted. The frame 1 may be of any suitable construction, but is here shown as consisting of an upper cross-bar 3 and a lower cross-bar 4, which are connected together at intervals by means of uprights 5.

The frame 1 may be constructed to hold any desired number of stanchions 2. Each of said stanchions consists of upper and lower cross-heads 6 and 7, to each of which is connected parallel bars 8. The bars of the upper cross-head 6 are of considerably greater length than the bars of the lower cross-head 7. Connected to one end of the cross-heads 6 and 7 is a stationary upright or standard 9, the upper and lower ends of which are secured between the ends of the bars 8. Pivotally mounted between the opposite ends of the bars 8 of the lower cross-head is a movable standard or upright 10, the upper end of which is slidably mounted between the extended ends of the bars 8 of the upper cross-head 6. Said bars are provided near their outer ends with a cross pin or bar 12, which limits the outward movement of the standard 10.

The outer surfaces of the cross-heads 6 and 7 are rounded or curved, as shown at 13, and are provided with centrally-disposed circular recesses 14, with which are adapted to be engaged pivot-pins 15, arranged in the cross-bars 3 and 4 of the supporting-frame 1. By rounding or curving the outer surfaces of the cross-heads 6 and 7 the frictional engagement between the same and the cross-bars 3 and 4 will be decreased, thus permitting the stanchions to turn more easily in said frame.

In order that the standard or upright 10 of the stanchion may be locked in a closed position, a suitable locking device is provided, said locking device being here shown as a latch-bar 16, which is pivotally mounted near its outer end between the extended ends of the plate 8 of the upper cross-head 6. Said outer pivoted end of the latch is curved downwardly, as shown at 17. The latch-bar is provided near its opposite end with a vertically-disposed aperture 18, with which is adapted to be automatically engaged a spring-projected locking-bolt 19, mounted in the recessed upper end of the standard 10. The lower end of the locking-bolt 19 has secured thereto a laterally-projecting stud or finger 20, which projects through a slot 21, formed in the side of the standard 10, whereby said bolt may be retracted or drawn inwardly against the tension of a spring 22, by which it is normally forced outwardly, so that when the standard 10 is pushed inwardly toward the standard 9 said bolt will engage the latch-bar 16 and will be projected into the aperture 18 formed therein, thereby locking said standard in its closed or operative position. Above the inner end of the latch-bar 16 is arranged a stop-pin 23, which limits the upward movement of said end of the latch-bar.

When the standard 10 is in an open or inoperative position, the latch-bar 16 will drop or swing downwardly to the position shown in Fig. 3 of the drawings. In this position the upper end of the latch may be engaged with a slot or recess 24, formed in the upper cross-bar of the supporting-frame 1, which will prevent the stanchion from being turned in said frame while the head of the animal is being inserted through the stanchion. When the stanchions are in closed or operative position, as shown in Figs. 1 and 2 of the drawings, the standards 9 and 10 will be in perpendicular parallel position and of such distances apart as to prevent the withdrawal of the animal's head. The pivotal arrangement of the stanchions in the supporting-frame 1 permits the head of the animal to be freely turned in one direction or the other. In order to release the animal from the stanchion, the finger or stud 20 is pressed downwardly in the slot 21, thereby disengaging the end of the bolt from the aperture 18 and permitting the standard 10 to be swung outwardly to the position shown in Fig. 3 of the drawings. When the standard 10 is thus swung outwardly, the latch-bar 16 will automatically drop or swing downwardly, thereby engaging the outer curved end of the same with the slot or recess in the upper cross-bar 3 of the supporting-frame, thus holding the stanchion against turning, so that the same is always in position to receive the animal's head.

Should the stanchion be open and the latch-bar down while swung out from between the bars 3 and 4 of the frame, the same may be swung back into position without first closing the stanchion by reason of the curved outer end 17 of the latch-bar 16, which will cause the bar to tilt when engaged with the bar 3, said latch dropping into engagement with the slot 24 when brought beneath the same.

The ends of the pivot-pins 15 in the cross-bars 3 and 4 are adapted to engage metallic bearing-thimbles 25, which are seated opposite each other in the heads 6 and 7 and across bars 3 and 4. On each side of the standards 10 opposite the stud or finger 20 are secured parallel plates 21, which protect the stud 20 against casual movement.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described our invention, what we claim as new, and desire to secure by Letters Patent, is—

A cattle-stanchion, comprising a securing-frame pivotally mounted in a supporting-frame, said securing-frame comprising upper and lower cross-heads, a fixed standard connected to one end of each of said cross-heads, a movable standard pivotally connected at its lower end to said lower cross-head, a latch-bar pivotally mounted in said upper cross-head, whereby when the stanchion is open said latch-bar will engage the supporting-frame and hold said stanchion in position, and a spring-projected locking-bolt arranged in said movable stanchion to engage said latch-bar and thereby lock said stanchion in closed or operative position, substantially as described.

In testimony whereof we have hereunto set our hands in presence of two subscribing witnesses.

PEARL B. TREWER.
JOHN T. TREWER.

Witnesses:
  E. NEWTON SHEPARD,
  ARCHIBALD J. CAMPBELL.